Patented June 28, 1938

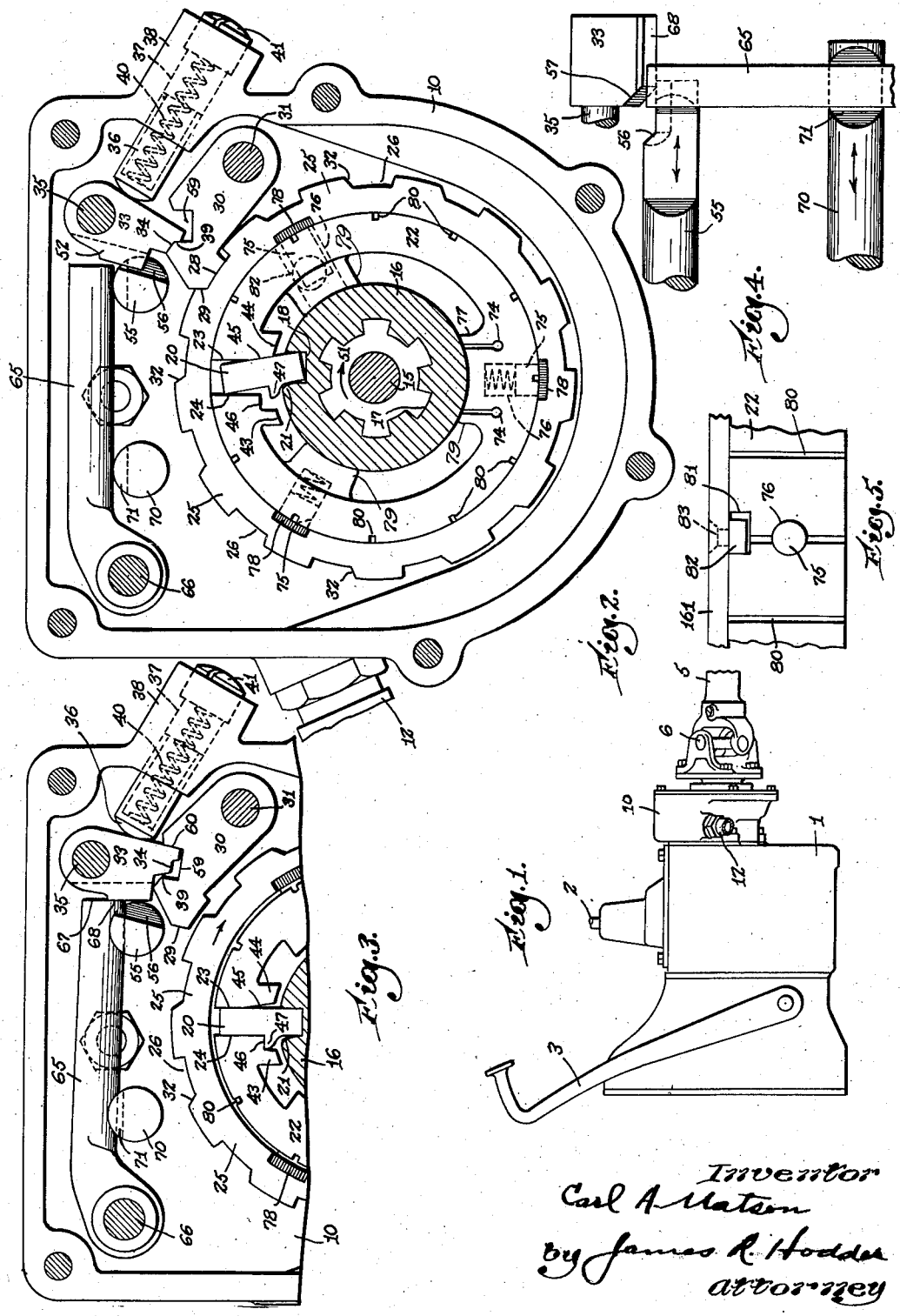

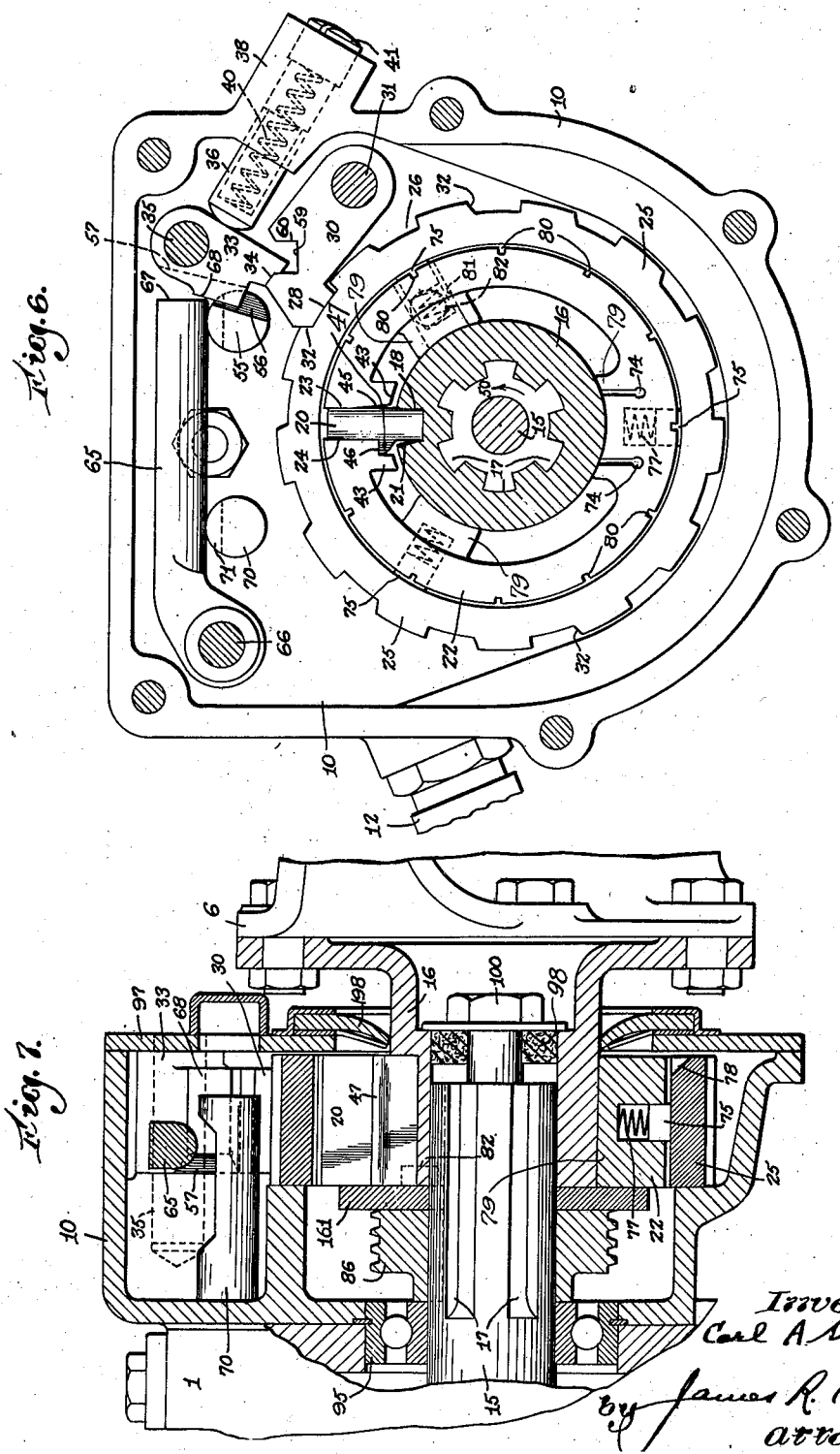

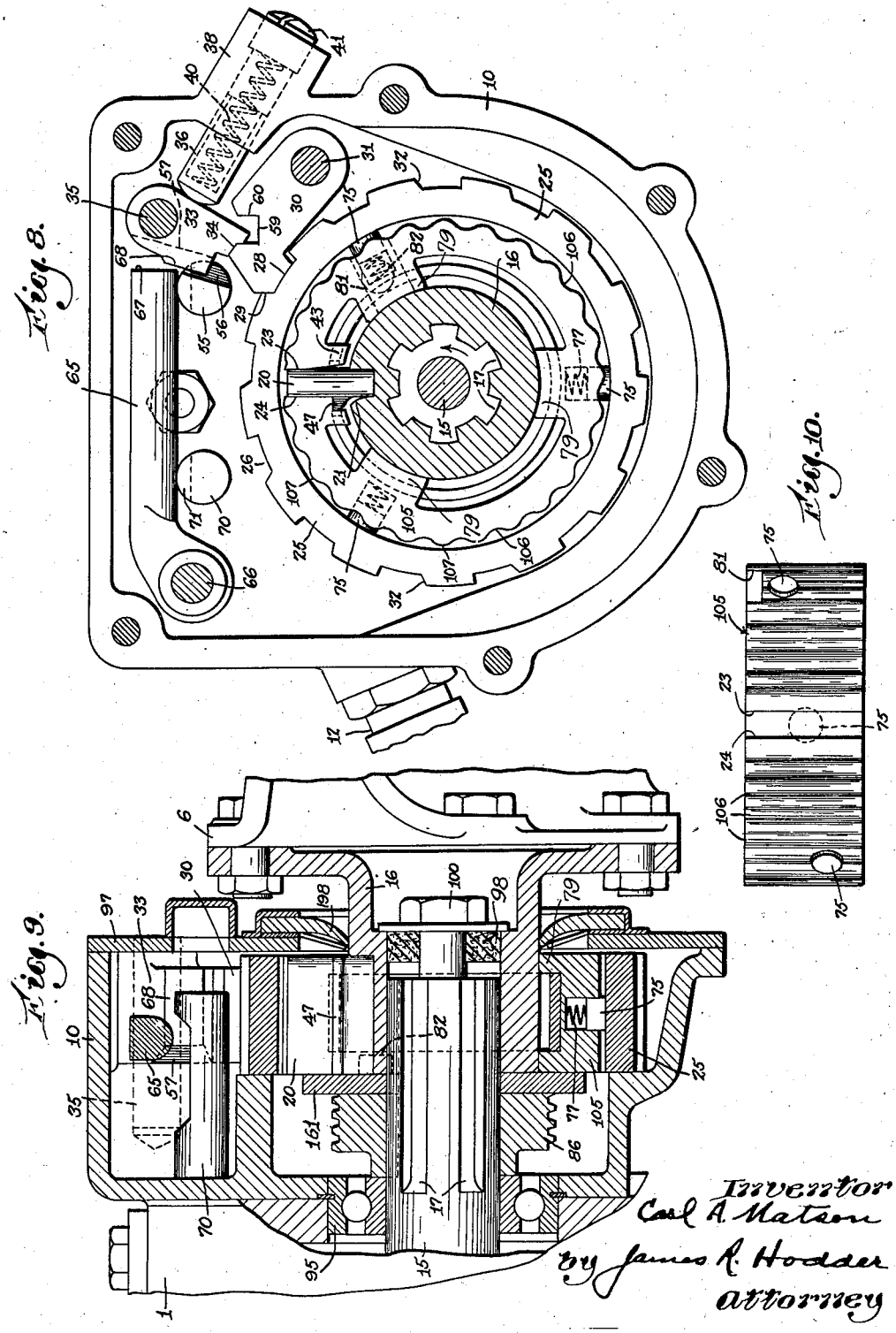

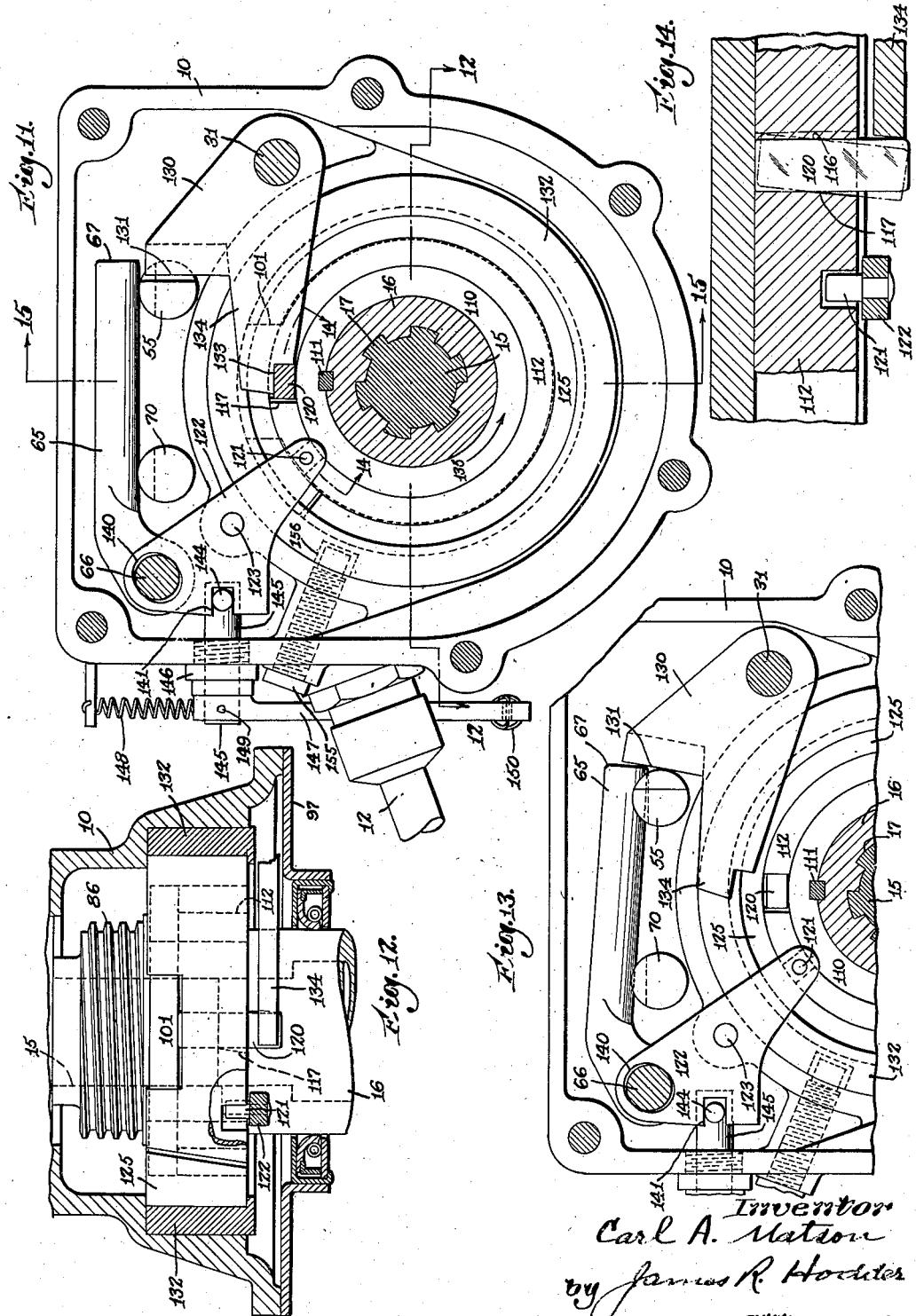

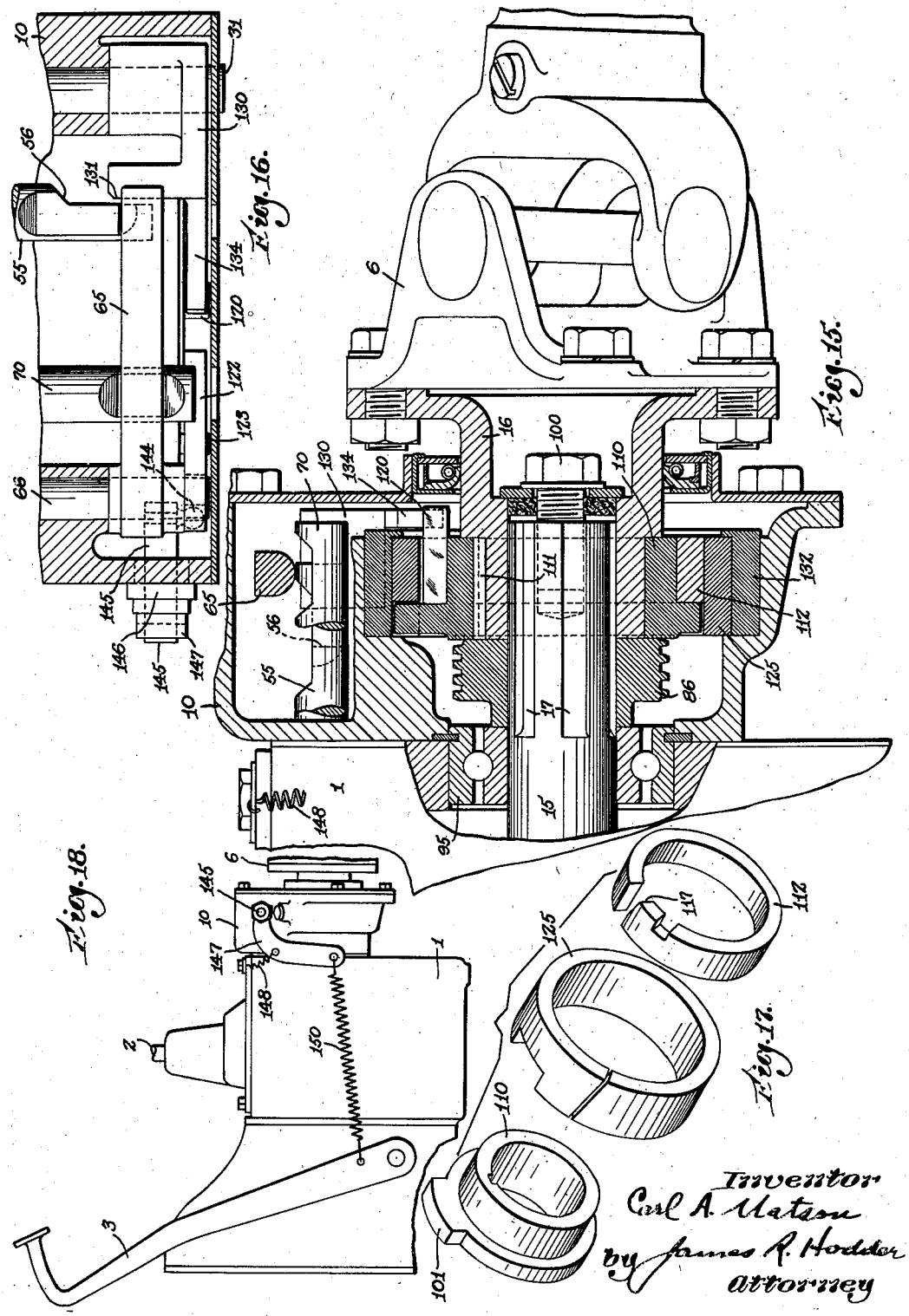

2,122,009

UNITED STATES PATENT OFFICE 2,122,009

NO-ROLL-BACK BRAKE FOR AUTOMOBILES

Carl A. Matson, Swampscott, Mass., assignor of one-half to John B. Jameson, Concord, N. H.

Application September 14, 1934, Serial No. 744,006

1 Claim. (Cl. 192—4)

My present invention is a novel and improved automatic brake mechanism primarily intended for use on automobiles to prevent an automobile from rolling backward when stopped on an incline or hill.

Heretofore, various devices have been developed for preventing reverse movement or rolling backward of automobiles when stalled on a grade or hill when the driving clutch is disconnected, and in my prior development of "no-rollback" brakes, I have devised various forms of such mechanism, as shown for example in my prior Patent No. 1,713,391, issued May 14, 1929, Reissue No. 18,377; Patent No. 1,713,392, Reissue No. 18,693, and various modifications and improvements thereon such as U. S. Patent Nos. 1,886,710, 1,919,474, and in my various pending applications.

In such prior applications, both of my own developments and those of other patents, it has been customary to utilize friction rollers or the like much in the nature of a Horton clutch, or somewhat similar friction members; but such prior devices have not been found satisfactory and have involved an expensive and complex construction which would not function with sufficient speed and accuracy under all conditions.

In my present invention I have developed distinctly novel types of devices, eliminated the rollers, ball-bearings, or the like, and have devised extremely simple, highly efficient, and instantly active clutching instrumentalities which are peculiarly efficacious in a no-roll-back brake or clutch for automobiles.

In carrying out my present invention I have developed a "cramping" member normally entirely free and out of engagement with the cooperating devices while the driving shaft is in rotation, but instantly operable on a reverse movement such as is imparted to the shaft when a car would tend to back down a hill or grade when the clutch is released or when stalled. My novel cramping member can be quickly installed on existing automobiles; is entirely free of accidentally catching, and its operation and function is insured under all conditions. The braking operation is positive and practically instantaneous while the construction is wear-resisting, or if any wear occurs, it is automatically compensated by the normal operation of the devices.

In carrying out my invention I apply a flexible cramping member around the normally moving driving shaft of an automobile, or other drive member, and I provide a friction ring or surface encircling the cramping member. Means are provided whereby the cramping member is normally moved with the driving shaft and either free of engagement of the encircling friction ring or traveling with the encircling ring, which ring is itself free to rotate until locked.

Furthermore, I can hold the mechanism out of engagement when the automobile gears are meshed for driving rearwardly, and I accomplish all these results automatically. To effect a locking action of the cramping ring I provide either a radially or horizontally actuated cramping pin, the cramping member being in the form of a flexible spring-like split ring with the cramping pin or key engaging the abutting faces of the split portion.

This pin or key being actuated at the initiation of the reverse movement of the driving shaft will expand the cramping member, actuate the same and hold the driving shaft against continued reverse movement until released.

I believe that the utilization of a cramping member, such as I have developed is a distinct novelty in this particular art and I therefore wish to claim the same herein broadly.

Further advantages, improvements, and novel details will be hereinafter more fully pointed out and claimed.

Referring to the drawings illustrating preferred embodiments of the present invention, Fig. 1 is a fragmentary diagrammatic view of my no-roll-back unit applied between the drive shaft and the universal joint in the usual type of automobile construction;

Fig. 2 is an enlarged cross-sectional view showing the cramping and braking action preventing reverse rotation;

Fig. 3 is a fragmentary view illustrating reverse movement of the shaft with the locking members out of position while the car is being driven rearwardly;

Fig. 4 is an enlarged plan view of the locking and releasing operating devices;

Fig. 5 is a fragmentary horizontal view of the means for normally carrying the cramping member in forward rotation with the shaft;

Fig. 6 is a vertical cross-sectional view in normal position during the forward rotation of the vehicle;

Fig. 7 is a right-angled cross sectional view of the mechanism as shown in Fig. 6;

Fig. 8 is a vertical cross-sectional view showing a modified form of cramping member;

Fig. 9 is a vertical cross-sectional view of the modification of Fig. 8;

Fig. 10 is a plan view of the cramping member;

Fig. 11 is a cross-sectional view of a modified form showing a horizontally positioned key to actuate the braking member;

Fig. 12 is a fragmentary cross-sectional view on the line 12—12 of Fig. 11;

Fig. 13 is a fragmentary cross-sectional view showing the brake released;

Fig. 14 is an enlarged cross-sectional fragmentary view illustrating the operation of the operating key.

Fig. 15 is a cross-sectional view on the line 15—15 of Fig. 11;

Fig. 16 is a fragmentary cross-sectional plan view of the modified form of Fig. 11;

Fig. 17 is a view in perspective of the three rings, and

Fig. 18 is a fragmentary diagrammatic view of the unit and brake pedal operating means.

As shown in the drawings, 1 designates generally the exterior of an automobile transmission gear case, 2 designating the usual hand gear shift lever, and 3 the foot brake. The position of this gear case in standard automobile construction is at the rear of the engine, and imparts variable speed to the propeller shaft 5, through the connections with the universal joint 6.

It is customary to attach to the engine driving shaft between the gear box 1 and the universal joint 6 a gear from which the speedometer of an automobile is driven, and it is one of the important advantages of my present invention to attach the no-roll-back unit at this point, which feature is described and claimed broadly in my copending application Serial No. 750,838 filed October 31, 1934.

The operating portions of my unit are enclosed within a casing 10, readily attached to and substituted for the speedometer driving gear casing, my entire unit being compact and contained within the space provided and from which the speedometer drive leads through a flexible shaft, as shown at 12.

The no-roll-back unit construction as shown in the preferred forms of Figs. 2, 3, and 6 will now be described. The drive shaft 15 of the engine carries a hub 16 keyed at 17 thereto and in constant rotation therewith. This hub has a notch 18 to receive one end of a key 20, said notch being formed slightly larger than the size of the key 20 which projects into said notch and with a rounded portion in one edge of the notch, as shown at 21, to permit tilting or cramping of the key 20, as will be explained. Surrounding the hub 16 is a braking member 22 in the form of a split ring with the abutting ends 23 and 24 normally spaced a distance slightly greater than the width of the key 20 which is fitted therein. Encircling the member 22 is a solid locking ring or brake 25, having a series of notches 26 in its outer periphery which are engaged by the head 28 of a pawl 30, said pawl being mounted on a pin 31 secured to the casing. Preferably the head 28 has a bevelled face 29, and each of the notches 26 has at one end a similar bevelled face 32 corresponding to the bevel 29 on the head of the pawl 30.

The pawl 30 is held in locked position, as shown in Figs. 2 and 6, by a locking prong 33 having a shouldered portion 34 fitting onto a correspondingly formed part 39 in the head of the pawl 30, the locking prong 33 being freely mounted on a stud 35 secured to the casing 10. Bearing against the locking prong 33 is a spring-pressed plunger 36 which is adapted to slide within a socket 37 in the extension 38 on the casing 10, with a coiled spring 40 bearing between the head of the plunger 36, which is preferably recessed to receive the same, as shown in Figs. 2, 3, and 6 and against the face of an adjustable screw 41, which is threaded into the extension 38 and serves to afford an adjustment of tension of said spring 40.

This spring-pressed plunger 36 normally tends to hold the locking prong 33 to force the pawl 30, with the head 28, into locking engagement with any one of the notches 26 which may be in position to receive the same. Preferably I form the member 22 with a pair of depending lugs 43 and 44 adjacent the abutting faces 23 and 24. The lug 43 has a bevelled or cut-away portion 45 substantially equivalent in extent to the bevelled face 21 on the hub 16 to facilitate the locking and, hence, binding action of the key 20. Also, I preferably form the lug 43 in the face 24, with a shoulder 46 to act as a bearing for the projection 47 on the key 20.

During the normal rotation of the driving shaft 15, as shown in the direction of the arrow 50, Fig. 6, the key 20 abutting between the faces 23 and 24 of the distortable or cramping brake member 22 will carry the same free of contact with the locking ring 25, which ring is held in fixed position by the pawl 30, the locking prong 33, and the spring-pressed plunger 36.

However, upon initiation of reverse movement of the shaft 15, as shown in the direction of the arrow 51, Fig. 2, the key 20 will spread the member 22, distorting the same sufficiently to contact against the inner face of the locking ring 25, thereby holding the same against reverse movement. The bevelled faces 21 and 45 facilitate this action of the key 20, as well as affording bearing surfaces for the key 20 during this operation.

With the key 20 thus acting to expand and distort the member 22, the whole mechanism is locked against reverse rotation and the parts are in position, as shown in Fig. 2. In order to release the locking action, I form on the end of the shifting levers which operate the gears in the gear box 1 bevelled faces suitably positioned to cooperate to release the locking action. 55 designates the usual gear shifting rod actuated by the gear shifting lever 2, which reciprocates in the direction of the arrow 56, this rod being that for the first forward speed. Hence, as the gear shift lever 2 is moved, the rod 55 is reciprocated and is provided with a bevelled face 56 adapted to cooperate with a corresponding bevelled face 57 on the locking prong 33. This moves the locking prong against the tension of the spring 40 and releases the pawl 30 by swinging the lower portion 34 out of engagement with the head 28 and into the cut-out part 59 in said pawl 30, raising the pawl 30 by contact with the face 60 of the pawl, as clearly shown in Fig. 3, thereby freeing the locking ring 25, releasing the brake action between the ring and member 22 and restoring these parts to normal position, with the key 20 in substantially radial position, as shown in Figs. 3 and 6.

In order to hold the locking pawl 30 and prong 33 in inoperative position as shown in Fig. 3 during the rear driving or pushing of the automobile rearwardly, I provide a pivoted rod 65 mounted on a pin 66, secured to the casing 10, and of suitable length to have its extreme end 67 bear against the face 68 of the locking prong 33 when the gear shifting rod 55 is moved into reverse position, see Fig. 3. Thus, the automobile may be either driven rearwardly or so moved by hand, as in a garage, or the like, with the locking unit held out of operation against reverse or rear rolling braking action, this action being entirely automatic when the gear shifting lever 2 is moved to connect the transmission gearing into rear driving operation.

To prevent the locking pin 65 from its action during the forward driving operation when the car is in second and high speeds, I form the shift rod 70 with a recessed part 71 so positioned that the locking pin 65 will be held upwardly out of contact with the locking prong 33, permitting the same to be pressed forwardly with the spring-pressed plunger 36 and, hence, held in the normal position as shown in Fig. 2.

To facilitate the spreading action of the cramping member 22, I preferably form the same with one or more kerfs 74—74 preferably at each side of a friction plunger 75, see Figs. 2 and 6. This facilitates the springing action of the member 22 when the key 20 is operated to spread the split faces 23 and 24 and prevents the member 22 from splitting. Preferably I arrange a plurality of these plungers 75—75, three being herein shown, in the form of spring-pressed plungers each arranged in the sockets 76 formed in the member 22 and with a spring 77 normally acting to press the plunger 75 outwardly in engagement with the inner surface of the ring 25. A projecting portion 79 of each socket extends substantially in contact with the outer surface of the hub 16 as clearly shown in Figs. 2, 6, and 8.

Preferably I form bevelled grooves 78 in the face of the edging of the ring 25 to facilitate the assembly of the member 22 with the plungers 75 therein as it is sliding into position, the bevelled faces 78 thus automatically compressing the spring-pressed plungers 75 until they are in contact with the inner surface of the ring 25, as will be appreciated.

I also prefer to form a plurality of oil carrying grooves 80 in the outer face of the member 22 which still further acts to prevent the opposite parts of the member 22 from slipping in action, as well as providing at all times means to carry the lubrication around the surfaces when desired.

As shown in Fig. 5, I may form a recess 81 in the side of the member 22 and apply a roll or stud 82 of less diameter than the recess 81 secured on a stem 83 to the member 161 which will function to carry the members 22 and 25 together when in non-breaking operation by reason of the lost motion between the roll 82 and recess 81. It will be noted that I apply my entire unit to the end portion of the drive shaft 15 without disturbing the usual ball bearings 85 and speedometer drive unit 86, which is connected with a flexible shaft 12, as previously explained, my unit being sufficiently compact to be contained within the casing 10 applied between the transmission 1 and universal joint structure 6, being enclosed in an oil-tight cover 97 and a flexible washer 198 by a headed bolt 100 threaded on the end of the shaft 15 with suitable packing 98, as is usual, completing the oil-tight construction. A washer 161 between the speedometer gear 86 and the member 22 and ring 25 is also provided.

Referring to the modification illustrated in Figs. 8, 9, and 10, I form the cramping member with a special exterior contour. In this form the cramping member 105 is provided with a series of transverse corrugations in the outer surface between the faces 23 and 24 which engage the key 20. These transverse grooves, designated at 106, are preferably formed as a series of wave-like contours with the top portions 107 of substantial extent to act as the contact members between the cramping member 105 and the inner surface of the ring 25 when the key 20 expands and distorts the member 105 into braking position.

The important object of the wave-like or grooved structure is to facilitate the operation of my brake mechanism when the oil or grease in which the unit is packed is cold and, hence, to have the mechanism readily operative at starting as well as after the oil and grease is warmed up and in liquid condition during the running of the engine.

Preferably, also, I form the spring-pressed plungers 75 in staggered relation so that these members 75 will not tend to form on the groove in the inner face of the ring 25 but, on the contrary, will cover the entire width of the surface of said ring; will aid in keeping the oil or grease scraped free therefrom, and will each have its own bearing line, thus distributing the friction and strain throughout the width of the member 22 and ring 25.

Referring to the modified form shown in Figs. 11, 12, 13, and 14, I have herein illustrated a form wherein I utilize a horizontal key to distort or spring the cramping member to effect the locking action. In this form, also, I preferably employ a three-ring structure, whereas in the former forms heretofore described, I utilize two only.

Referring to the modification of Figs. 11 to 18, I key to the member 16 within the casing 10 a ring 110 at 111. Surrounding the ring 110 is the distortable member 112 having opposed faces 116 and 117 in contact with the horizontal key 120, which acts to spread the cramping member 112 and lock the mechanism against reverse movement. Normally the member 112 is kept from rotation in the present form by a stud 121 held on an arm 122, which arm is pivoted at 123 and extends around the stud 66 carrying the pivoted rod 65. Surrounding the cramping member 112 is a second ring 125 which, preferably, is in the form of a split ring structure, as shown in Fig. 11. The split ring 125 is provided with a notch in which the element 101 is adapted to fit, as shown clearly in detail in Fig. 17, and the cramping member 112 is adapted to fit within 125 and over the hub or ring 110, as clearly illustrated in separate prospective in said Fig. 17. Pivoted to the stud 31 is a locking pawl 130 formed with a face 131 in position to be actuated by the shifting rod 55 and with an arm 134 formed with a shouldered portion 133 in position to engage that portion of the horizontal key 120 which projects beyond the width of the cramping member 112, as shown in Figs. 12 and 14. When the beveled end face of the rod 55 strikes the facing 131 of the locking pawl 130, the same is raised and the rod 65 will drop into position to hold the locking lever 130, as shown in Fig. 13, and thus normally out of position, causing the mechanism to be inoperative—such as during backing or reverse movement of the car. Upon the shifting of the gears to forward speed, however, the rod 65 is raised by its contact with the bevelled faces on the shifting rod 55 or 70, and the locking pawl 130 drops, by its own weight, into position with the arm 134 in alignment with the projecting end of the horizontal cramping key 120, as shown in Figs. 11 and 12. While the vehicle is being driven ahead or in the direction of the arrow 135, viewed in Figs. 11 to 14, there is no clamping action; but the instant a reverse movement is effected, the key 120 is twisted or cramped by the lever 130, spreading the member 112 and distorting it sufficiently to effect a braking action and to hold the shaft 15 and connected portions against reverse movement.

In the modified form as above explained wherein three ring-like members are provided, with the intermediate ring-like member for the distortable braking action, I provide a separate attachment to effect release of the same. For this purpose the arm 122 has a rearward extension with an enlarged opening 140 to fit over the stud 66, said opening permitting a limited amount of oscillation on the pivot 123. The arm 122 is also provided with a recess 141 in which a pawl member 144 projects from a shaft 145, said shaft being mounted in suitable bearings 146 in the casing 10 and extending outside the same, to which outer portion a lever 147 is secured by a set screw 149. A spring 148 normally holds said arm 147 upwardly with a pawl actuating the lever 122 to move the pin 121 to the right, viewed in Fig. 11, under a slight yielding tension. This action tends to hold the member 112 in desired position and against the line of rotation of the shaft 15 and the shaft 110. Secured to the lower part of the arm 147 is a spring 150 with its other end attached to the brake lever 3. Hence upon the operator applying pressure to the brake lever 3, the shaft 145 which is mounted in a suitable bearing in the frame 10 at the side, as best shown in Figs. 11 and 18, is rocked relieving the tension of the spring 148, thus exerting considerable rocking action on the lever 122 moving it on its pivot 123 to the limit allowed by the enlarged opening 140 on the stud 66 and positively but yieldingly imparting a movement of the member 112 against the rotation of the shaft 15 and associated parts, thus also closing the space or gap normally between the ends of the member 112 and the cramping key 120, moving the key directly into contact with the locking pawl 130; thereupon instantly permitting the locking pawl to take effect on the key 120, and thus apply the braking action by expanding the member 112. These members 110, 112, and 125 are all enveloped by a flanged ring 132 which will hold them in assembled position. This flange ring 132 is adapted to fit within a shouldered recess formed in the interior of the casing 10, as shown in Fig. 12. A set screw 155 is threaded thru a tapped recess in the side of the casing to engage a notch 156 in the ring 132 to hold the same in adjusted position.

By this means I prevent any substantial rearward movement of the automotive vehicle before the no-roll-back brake takes effect, thereby securing substantially instant braking action.

While this method just described is not automatic and, therefore, not as desirable in many cases as the two-ring structure of the first described figures and operation, yet it is extremely simple in construction and operation and a very economical unit to build, assemble and install.

In both forms of my present no-roll-back structure, an extremely simple and compact unit is provided and one wherein I can utilize to the fullest extent the advantages of my novel arrangement wherein I connect the entire no-roll-back structure on the drive shaft by simply removing the speedometer driving gear, or a part of same, assembling my unit thereto and cramping the same with its entire casing thereon. I have described and claimed this feature broadly in my copending application Serial No. 750,838, filed October 31, 1934.

I claim:

In a no-roll-back brake of the kind described, a driving shaft, a cramping member partly encircling said drive shaft, means encircling said cramping member and adapted to be clutched by the distortion of said cramping member to hold the shaft against reverse rotation, and means providing a preliminary friction engagement between said cramping member and said encircling means in combination with an operating key contacting on the ends of said member.

CARL A. MATSON.